US010336371B2

(12) United States Patent
Sawa et al.

(10) Patent No.: US 10,336,371 B2
(45) Date of Patent: Jul. 2, 2019

(54) IMPACT ABSORBING MEMBER (71) Applicant: NIPPON STEEL & SUMITOMO METAL CORPORATION, Tokyo (JP)

(72) Inventors: Yasunori Sawa, Tokyo (JP); Yoshiaki Nakazawa, Tokyo (JP); Koichi Hamada, Tokyo (JP); Yasunori Ito, Tokyo (JP); Hiroshi Yoshida, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/519,034

(22) PCT Filed: Oct. 16, 2015

(86) PCT No.: PCT/JP2015/079348
§ 371 (c)(1),
(2) Date: Apr. 13, 2017

(87) PCT Pub. No.: WO2016/060255
PCT Pub. Date: Apr. 21, 2016

(65) Prior Publication Data
US 2017/0233005 A1 Aug. 17, 2017

(30) Foreign Application Priority Data
Oct. 17, 2014 (JP) .................. 2014-212631

(51) Int. Cl.
*B62D 21/15* (2006.01)
*B60R 19/34* (2006.01)
(Continued)

(52) U.S. Cl.
CPC .............. *B62D 21/15* (2013.01); *B60R 19/34* (2013.01); *B62D 25/00* (2013.01); *F16F 7/00* (2013.01);
(Continued)

(58) Field of Classification Search
CPC ......... B62D 21/15; B60R 19/34; B60R 19/24; B60R 19/26; F16F 7/12; F16F 7/121; F16F 2224/0233
(Continued)

(56) References Cited

U.S. PATENT DOCUMENTS 6,258,465 B1 * 7/2001 Oka ...................... B62D 21/157
148/690
8,360,490 B2 * 1/2013 Handing ................. B60R 19/18
293/102
(Continued)

FOREIGN PATENT DOCUMENTS

DE  10 2004 034 519 B3  3/2006
EP     2 565 489 A1      3/2013
(Continued)

OTHER PUBLICATIONS

Machine English translation of JP 2002-249067 A (Sep. 3, 2002).
(Continued)

*Primary Examiner* — Gregory A Blankenship
(74) *Attorney, Agent, or Firm* — Birch, Stewart, Kolasch & Birch, LLP (57) ABSTRACT

An impact absorbing member 10 able to secure absorption energy while lightening weight by absorbing the impact load applied in the axial direction by periodic buckling, wherein the impact absorbing member 10 is provided with a main body 20 comprised of metal sheet and having a polygonal shape in cross-section vertical to an axial direction and a center sheet 30 comprised of metal sheet and provided at a hollow part in the main body along the axial direction, the polygonal shape of the main body 20 includes a pair of long side (20a, 20b) facing each other, the center sheet 30 is joined to each of the long sides (20a, 20b) of the polygonal shape of the main body 20, and the sheet thickness t1 (mm)
(Continued)

of the main body 20 and the sheet thickness t2 (mm) of the center sheet 30 satisfy $1.3 \times t1 \leq t2$.

8 Claims, 7 Drawing Sheets

(51) Int. Cl.
*F16F 7/12* (2006.01)
*F16F 7/00* (2006.01)
*B62D 25/00* (2006.01)

(52) U.S. Cl.
CPC .............. *F16F 7/12* (2013.01); *B62D 21/152* (2013.01); *B62D 21/157* (2013.01); *F16F 2224/0233* (2013.01)

(58) Field of Classification Search
USPC ................... 296/187.03; 293/102, 132, 133
See application file for complete search history.

(56) References Cited

U.S. PATENT DOCUMENTS

| | | | | |
|---|---|---|---|---|
| 9,242,612 | B2* | 1/2016 | Kawamata | B60R 19/34 |
| 9,381,880 | B2* | 7/2016 | Matecki | B60R 19/023 |
| 9,815,424 | B2* | 11/2017 | Oku | B60R 19/03 |
| 9,884,597 | B2* | 2/2018 | Matecki | B60R 19/023 |
| 2001/0011833 | A1* | 8/2001 | Artner | B62D 21/152 |
| | | | | 296/187.03 |
| 2003/0042763 | A1* | 3/2003 | Yamada | F16F 7/12 |
| | | | | 296/205 |
| 2003/0164623 | A1* | 9/2003 | Yoshida | B62D 21/15 |
| | | | | 296/30 |
| 2004/0084910 | A1* | 5/2004 | Amano | B60R 19/18 |
| | | | | 293/102 |
| 2004/0201252 | A1* | 10/2004 | Bechtold | B29C 70/24 |
| | | | | 296/187.03 |
| 2008/0106107 | A1* | 5/2008 | Tan | B60R 19/34 |
| | | | | 293/133 |
| 2010/0194125 | A1* | 8/2010 | Wibbeke | B60R 19/24 |
| | | | | 293/120 |
| 2011/0291431 | A1* | 12/2011 | Buschsieweke | B60R 19/34 |
| | | | | 293/133 |
| 2012/0043772 | A1* | 2/2012 | Kinefuchi | B60R 19/03 |
| | | | | 293/102 |
| 2016/0200371 | A1* | 7/2016 | Inamoto | B62D 25/04 |
| | | | | 296/203.01 |
| 2017/0233005 | A1* | 8/2017 | Sawa | B62D 21/15 |
| | | | | 296/187.03 |
| 2017/0328435 | A1* | 11/2017 | Kamiya | F16F 7/124 |
| 2018/0065675 | A1* | 3/2018 | Maier | B62D 21/152 |

FOREIGN PATENT DOCUMENTS

| | | |
|---|---|---|
| JP | 2002-249067 A | 9/2002 |
| JP | 2007-30778 A | 2/2007 |
| JP | 2008-247379 A | 10/2008 |
| JP | 4766422 B2 | 9/2011 |
| JP | 5168477 B2 | 3/2013 |
| WO | WO 2010/013713 A1 | 2/2010 |
| WO | WO 2012/026578 A1 | 3/2012 |

OTHER PUBLICATIONS

Machine English translation of JP 2008-247379 A (Oct. 16, 2008).
Machine English translation of JP 2010-116136 A (May 27, 2010), corresponding to WO 2010/013713 A1 (Feb. 4, 2010).
Machine English translation of JP 4766422 B2 (Sep. 7, 2011).
Machine English translation of JP 5168477 B2 (Mar. 21, 2013).
International Search Report, issued in PCT/JP2015/079348, dated Dec. 22, 2015.
Written Opinion of the International Searching Authority, issued in PCT/JP2015/079348, dated Dec. 22, 2015.
Office Action dated May 13, 2019 in corresponding Indian Patent Appiication No. 201717015943 with English translation.

* cited by examiner

IMPACT ABSORBING MEMBER

TECHNICAL FIELD

The present invention relates to an impact absorbing member for absorbing an impact load applied in an axial direction by means of periodic buckling.

BACKGROUND ART

Impact absorbing members are used in automobiles, trains, ships, and other transport machines. These impact absorbing members can absorb the energy of impact by deforming under the impact load received at the time of impact and enable safety of the passengers along with this. As such impact absorbing members, for example, there are frame members or crush boxes of automobiles.

Figure 1:
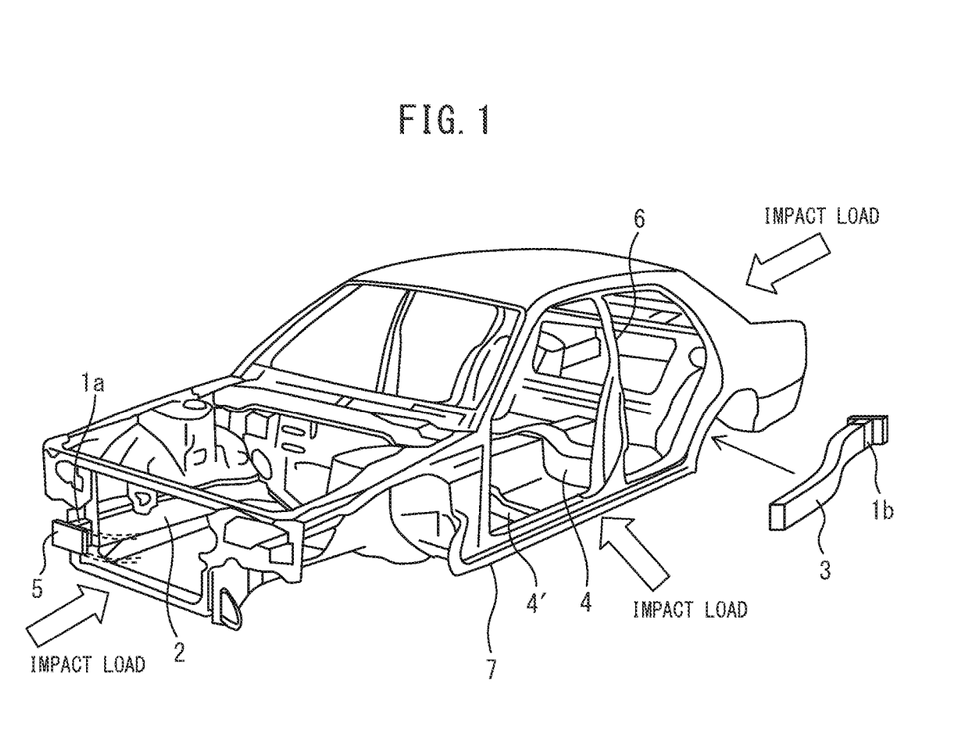
FIG. 1 is a perspective view schematically showing the arrangement of frame members and crush boxes in an automobile.

FIG. 1 is a perspective view schematically showing the arrangement of frame members and crush boxes in an automobile. As shown in this figure, at the four sides of an automobile, a front side member 2, rear side member 3, and side seals 7 are arranged. These members are all provided along the front-rear direction of the automobile. The front side member 2 is arranged at the front part of the four sides of the automobile, the rear side member 3 is arranged at the rear part of the four sides of the automobile, and the side seals 7 are arranged at the middle parts in the four sides of the automobile.

At the center part of the automobile in the front-rear direction, a floor is provided. On the floor, floor cross members (4, 4') are arranged. The floor cross members (4, 4') extend in the extension direction of the automobile.

Crush boxes (1a, 1b) are arranged at the front end of the frame formed by the above-mentioned frame members. More specifically, a first crush box 1a is provided at the front end of the front side member 2, while a second crush box 1b is provided at the rear end of the rear side member 3.

The frame members of these front side member 2, rear side member 3, side seal 7, and floor cross members (4, 4') and the crush boxes (1a, 1b) sometimes receive loads in their axial directions at the time of impact. In this case, these members deform by buckling so as to be compressed in the axial direction in a bellows like manner and thereby absorb the impact load.

Such impact absorbing members can be fabricated by bending or overlay welding of metal sheet materials. Impact absorbing members fabricated from metal sheet are tubular. That is, they have closed cross-sectional shapes vertical to the axial direction. For this reason, the impact absorbing members are hollow at the insides.

Various proposals have been made in the past for an impact absorbing member absorbing an impact load by periodic buckling.

PLT 1 describes a crush box. This crush box is provided with not only the member forming the hollow cross-section, but also a center sheet extending in a horizontal manner so as to partition the hollow region to a top and bottom section near the center in the vertical direction of the hollow cross-section. By providing the center sheet, the crush box is made to not buckle and be crushed at the time of impact and to be kept from bending. In this example of the configuration, the members forming the hollow cross-section (first member and second member) and the third member forming the center sheet are all the same in sheet thickness of the metal sheet.

PLT 2 also describes a crush box. The crush box is arranged between a front side member and a bumper member at the front side of a vehicle. Further, the crush box is provided with a tubular shaped box main body and a reinforcement connecting a pair of facing wall parts of the box main body facing each other. If providing the reinforcement at the hollow part of the box main body, when setting the performance of the crush box to the target performance, it is considered possible to set it to the desired performance by the shape or size of the reinforcement. In this PLT 2, the sheet thickness of the metal sheet used for the box main body and the reinforcement are not studied at all.

CITATION LIST

Patent Literature

PLT 1: Japanese Patent No. 4766422
PLT 2: Japanese Patent No. 5168477

SUMMARY OF INVENTION

Technical Problem

The impact absorbing member, as explained above, is sometimes fabricated from metal sheet. In this type, the shape in the cross-section vertical to the axial direction is closed. For example, it is a polygonal shape. For this reason, the impact absorbing member is hollow at the inside.

In such an impact absorbing member fabricated from metal sheet, as the method of securing axial crushing performance, if the cross-sectional shape is a rectangular shape, the method of reducing the ratio (Wp/t) of the width Wp of the straight line parts of the short sides (see later explained FIG. 2(b), units: mm) and the sheet thickness "t" (mm) can be employed. In this method, Wp/t is made smaller to make the buckling wavelength shorter and increase the absorption energy by the impact absorbing member.

Further, the method of increasing the total of the cross-sectional areas of the curved parts connecting one side and another side can also be employed. With this method, the buckling load becomes higher, the buckling behavior becomes stable, and the absorption energy by the impact absorbing member can be increased.

On the other hand, PLTs 1 and 2 describe provision of a metal sheet member called a "center sheet" or "reinforcement" in a hollow part along the axial direction. Below, the metal sheet member forming the hollow part will be called the "main body" while the metal sheet member provided in the hollow part along the axial direction will be called the "center sheet".

If configuring the impact absorbing member by the main body and center sheet in this way, it becomes possible for the center sheet to assist the absorption of energy by the main body. For this reason, it is possible to increase the absorption energy by the impact absorbing member. For example, this is effective in an impact absorbing member of a large-sized vehicle.

When forming an impact absorbing member by a main body and a center sheet, the energy is mainly absorbed by the main body and is secondarily absorbed by the center sheet. For this reason, the sheet thickness of the center sheet is thinner than the sheet thickness of the main body. Alternatively, as shown in the example of the configuration of PLT 1, the sheet thickness of the center sheet is the same as the sheet thickness of the main body.

In this regard, in automobiles, lighter weight of parts is being demanded from the viewpoint of improvement of the fuel efficiency. For this reason, in impact absorbing members, securing the absorption energy while lightening the weight has been sought.

The present invention was made in consideration of this problem and has as its object to provide an impact absorbing member able to secure the absorption energy while lightening the weight.

Solution to Problem

The inventors intensively studied the method of securing the absorption energy while lightening the weight of an impact absorbing member.

To lighten the weight of an impact absorbing member, reducing the sheet thickness of the main body may be considered. However, in general, if making the sheet thickness of the main body thinner, when the impact absorbing member receives impact load, the deformation becomes predominately out-of-plane deformation (deformation toward the outside of the closed cross-section) and the absorption of impact energy becomes smaller.

As a result of studies by the inventors, it was discovered that if suitably designing the center sheet of the impact absorbing member, it is possible to cause buckling deformation different in phase at the two sides of the center sheet, reduce the amplitude of deformation, and shorten the wavelength. Due to this, the deformation when the impact absorbing member receives an impact load becomes predominately buckling. As a result, not only does the absorption energy by an impact absorbing member increase, but also it is possible to increase the energy absorbed per unit mass. Therefore, it was learned that even if reducing the sheet thickness of the main body, it is possible to secure absorption energy and possible to secure absorption energy while lightening weight.

The present invention was made based on this discovery and has as its gist the following:

[1] An impact absorbing member absorbing an impact load applied in an axial direction comprising a main body comprised of metal sheet and having a polygonal shape in a cross-section vertical to the axial direction; and a center sheet comprised of metal sheet and provided in a hollow part inside the main body along the axial direction, wherein the polygonal shape of the main body includes a pair of long sides facing each other, the center sheet is joined to each of the long sides of the polygonal shape of the main body, and a sheet thickness of the center sheet is greater than a sheet thickness of the main body.

[2] The impact absorbing member according to [1], wherein the sheet thickness of the main body is 2.3 mm or less.

[3] The impact absorbing member according to [1] or [2], wherein the sheet thickness t1 (mm) of the main body and the sheet thickness t2 (mm) of the center sheet satisfy the following formula (1):

$$1.3 \times t1 \leq t2 \tag{1}$$

[4] The impact absorbing member according to any one of [1] to [3], wherein in the pair of the long sides, a width W1 (mm) of the long side satisfies the following formula (2):

$$W1/t1 \geq 20 \tag{2}$$

[5] The impact absorbing member according to any one of [1] to [4], wherein the main body is comprised of a single metal sheet, the center sheet is joined to each of the long sides of the polygonal shape of the main body by an overlay welding, and in the pair of the long sides, distance d1a (mm) and d1b (mm) along a with direction of the long sides satisfy the following formula (3), the distances d1a (mm) and d1b (mm) being from the middle of the sheet thickness of the center sheet at the middle position in a width direction of the center sheet to both end points of the long sides:

$$0.5 \leq d1a/d1b \leq 2 \tag{3}$$

[6] The impact absorbing member according to any one of [1] to [5], wherein the main body is comprised of a first metal sheet forming a part of the polygonal shape and a second metal sheet forming a remainder of the polygonal shape, the first metal sheet and the second metal sheet are joined at each of the long sides of the polygonal shape by an overlay welding together with the center sheet, and in the pair of the long sides, a distance d3a (mm) along a width direction of the long sides, the distance from the middle of the sheet thickness of the center sheet at the middle position in a width direction of the center sheet to and end point of the long sides in the first metal sheet, and a distance d3b (mm) along a width direction of the long sides, the distance from the middle of the sheet thickness of the center sheet at the middle position in a width direction of the center sheet to an end point of the long sides in the second metal sheet, satisfies the following formula (4):

$$0.5 \leq (d3a/t1a)/(d3b/t1b) \leq 2 \tag{4}$$

where, t1a (mm) is a sheet thickness of the first metal sheet, and t1b (mm) is a sheet thickness of the second metal sheet.

[7] The impact absorbing member according to any one of [1] to [6], wherein the metal sheet forming the main body is a steel sheet having a tensile strength of 780 MPa or more.

[8] The impact absorbing member according to any one of [1] to [7], wherein the metal sheet forming the center sheet has a Young's modulus of 180 GPa or more.

[9] The impact absorbing member according to any one of [1] to [8], used for a crush box, a front side member, a rear side member, a side seal, or a floor cross member of an automobile.

Advantageous Effects of Invention

In the impact absorbing member of the present invention, buckling deformation differing in phase occurs at the two sides of the center sheet, the amplitude of the deformation becomes smaller, and the wavelength becomes shorter. Due to this, not only does the absorption energy by the impact absorbing member increase, but also the energy absorbed per unit mass can be made to increase. Therefore, even if making the sheet thickness of the main body thinner, it is possible to secure the absorption energy and possible to secure absorption energy while lightening the weight.

BRIEF DESCRIPTION OF DRAWINGS

FIGS. 2A and 2B are schematic views showing an example of the configuration of an impact absorbing member of the present invention, wherein FIG. 2(a) is a front view and FIG. 2(b) is a cross-sectional view along A-A.

FIGS. 4A and 4B are cross-sectional views showing other examples of the configuration in the case where the main body is comprised of a single metal sheet, wherein FIG. 4(a) shows an example of the configuration where the straight part of the center sheet is not vertical to the long sides of the main body, while FIG. 4(b) shows an example of the configuration where the main body is a trapezoidal shape.

DESCRIPTION OF EMBODIMENTS

Below, the impact absorbing member of the present embodiment will be explained while referring to the drawings.

FIGS. 2A and 2B are schematic views showing an example of the configuration of an impact absorbing member of the present invention, wherein FIG. 2(a) is a front view and FIG. 2(b) is a view along the cross-section of A-A. The impact absorbing member 10 shown in FIGS. 2A and 2B is provided with a main body 20 and a center sheet 30.

The main body 20 has a polygonal shaped cross-section vertical to the axial direction. The main body 20 shown in FIG. 2(b) has a tetragonal shaped cross-section. The main body 20 has a closed cross-sectional shape and forms a tubular shape.

The sides of the polygonal shape are straight. Adjoining sides are connected by arcs. Further, the polygonal shape has a pair of long sides facing each other. Here, a "long side" means the longest side among the sides of the polygonal shape. In the polygonal shape of the main body 20 shown in FIG. 2(b), the first long side 20a and second long side 20b correspond to the pair of long sides. The first long side 20a and second long side 20b are longer compared with the other sides.

At a long side, the metal sheet does not have to be continuous. It may also include a connecting part in the middle. In FIG. 2(b), the second long side 20b is comprised of continuous metal sheet, but the first long side 20a is not comprised of continuous metal sheet on the long side and includes a connecting part in the middle. The polygonal shape of the present invention may also be comprised in this way.

The center sheet 30 is provided along the axial direction of the hollow part inside the main body 20. The center sheet 30 has two edge parts joined with the main body 20 and a straight part provided between these two edge parts. The two edge parts and straight part are connected by arcs.

Further, the center sheet 30 is joined to each of the long sides (20a, 20b) of the polygonal shape of the main body. Specifically, it is provided from the middle of the first long side 20a of the polygonal shape which the main body 20 forms to the middle of the second long side 20b. In the impact absorbing member shown in FIG. 2(b), the two edge parts of the center sheet 30 are welded at the middle of the first long side 20a of the polygonal shape and the middle of the second long side 20b of the polygonal shape while overlaid at the main body 20.

In the impact absorbing member of the present embodiment able to employ such an example of the configuration, the sheet thickness of the main body 20 is 2.3 mm or less. The sheet thickness of the center sheet 30 is thicker than the sheet thickness of the main body 20.

By making the sheet thickness of the center sheet 30 thicker than the sheet thickness of the main body 20, it is possible to suppress out-of-plane deformation of the main body when impact load is applied to the impact absorbing member and cause continuous buckling deformation, so even if the sheet thickness of the main body 20 is made thin, the absorption energy can be increased.

Figure 3:
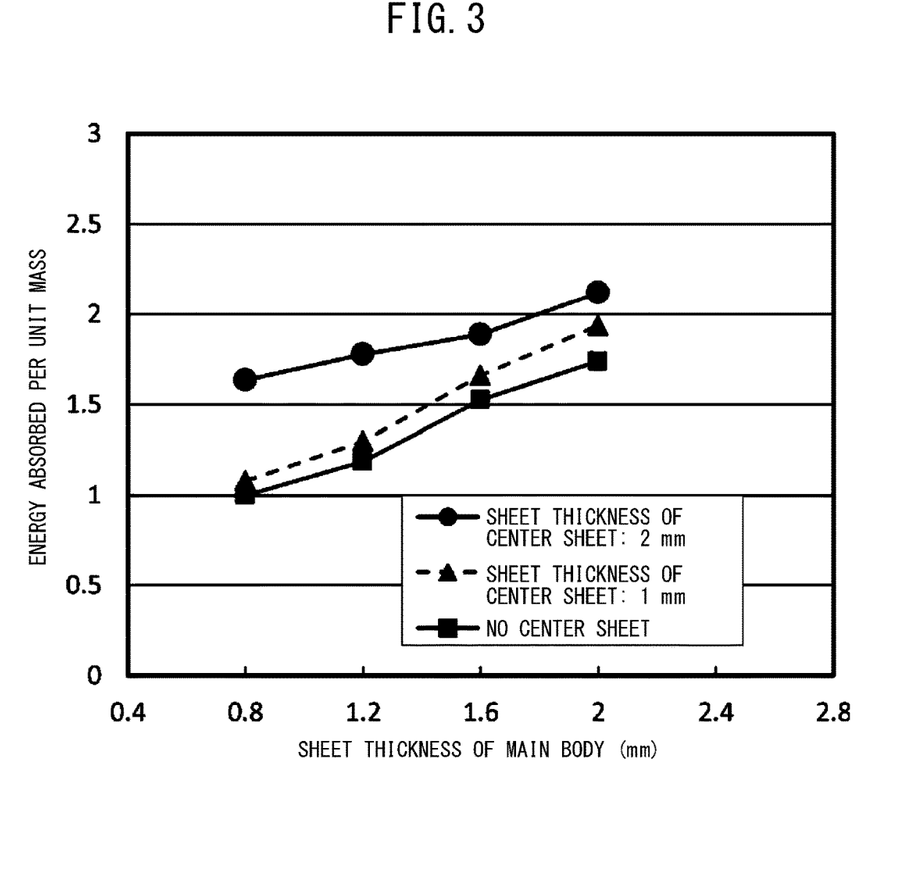
FIG. 3 is a view showing the relationship between a sheet thickness of a main body and an energy absorbed per unit mass when changing a sheet thickness of a center sheet.

FIG. 3 is a view showing the relationship between the sheet thickness of the main body and the energy absorbed per unit mass when changing the sheet thickness of the center sheet. When the sheet thickness of the center sheet at FIG. 3 is 2 mm, the test was performed based on the invention examples of the later explained examples. Further, when the sheet thickness of the center sheet is 1 mm, the test was performed based on Comparative Example 1 of the later explained examples. In the case of no center sheet, the test was performed based on Comparative Example 2 of the later explained examples without providing the center sheet. In each case, the sheet thickness of the main body was made to change from 0.8 to 2.0 mm in range. The energy absorbed per unit mass (unit: none) shown in FIG. 3 was made the energy absorbed per unit mass (kJ/kg) divided by the energy absorbed per unit mass (kJ/kg) when making the sheet thickness of the main body 0.8 mm and not providing a center sheet. That is, it is shown by the absolute value based on the energy absorbed per unit mass in the case of making the sheet thickness of the main body 0.8 mm and not providing a center sheet.

From FIG. 3, it is learned that the energy absorbed per unit mass changes due to the sheet thickness of the center sheet. Specifically, the thicker the sheet thickness of the center sheet, the greater the energy absorbed per unit mass. That is, if increasing the sheet thickness of the center sheet, it is possible to increase the energy absorbed per unit mass.

However, if the sheet thickness of the center sheet increases, the mass of the impact absorbing member becomes larger, so the sheet thicknesses of the main body and the center sheet should be determined while considering the balance between the increase in mass and improvement in the absorbed energy. If considering the balance between the increase in mass and improvement in the absorbed energy, the sheet thickness t1 of the main body and the sheet thickness t2 of the center sheet preferably satisfy the following formula (1):

$$1.3 \times t1 \leq t2 \tag{1}$$

Next, the deformation behavior of the impact absorbing member of the present embodiment will be explained while compared with the deformation behavior of a conventional impact absorbing member.

The impact absorbing member of the present embodiment absorbs the impact load by periodic buckling deformation resulting in contraction in the axial direction in a bellows like manner. Specifically, according to the impact absorbing member shown in FIG. 2, the long sides (surfaces, notations: 20a, 20b) of the main body including the parts joined with the center sheet (overlay weld zones) deform so that displacement occurs in the direction vertical to the long sides (surfaces) (X-direction in FIG. 2) so as to thereby deform in a bellows like manner.

Figure 2:
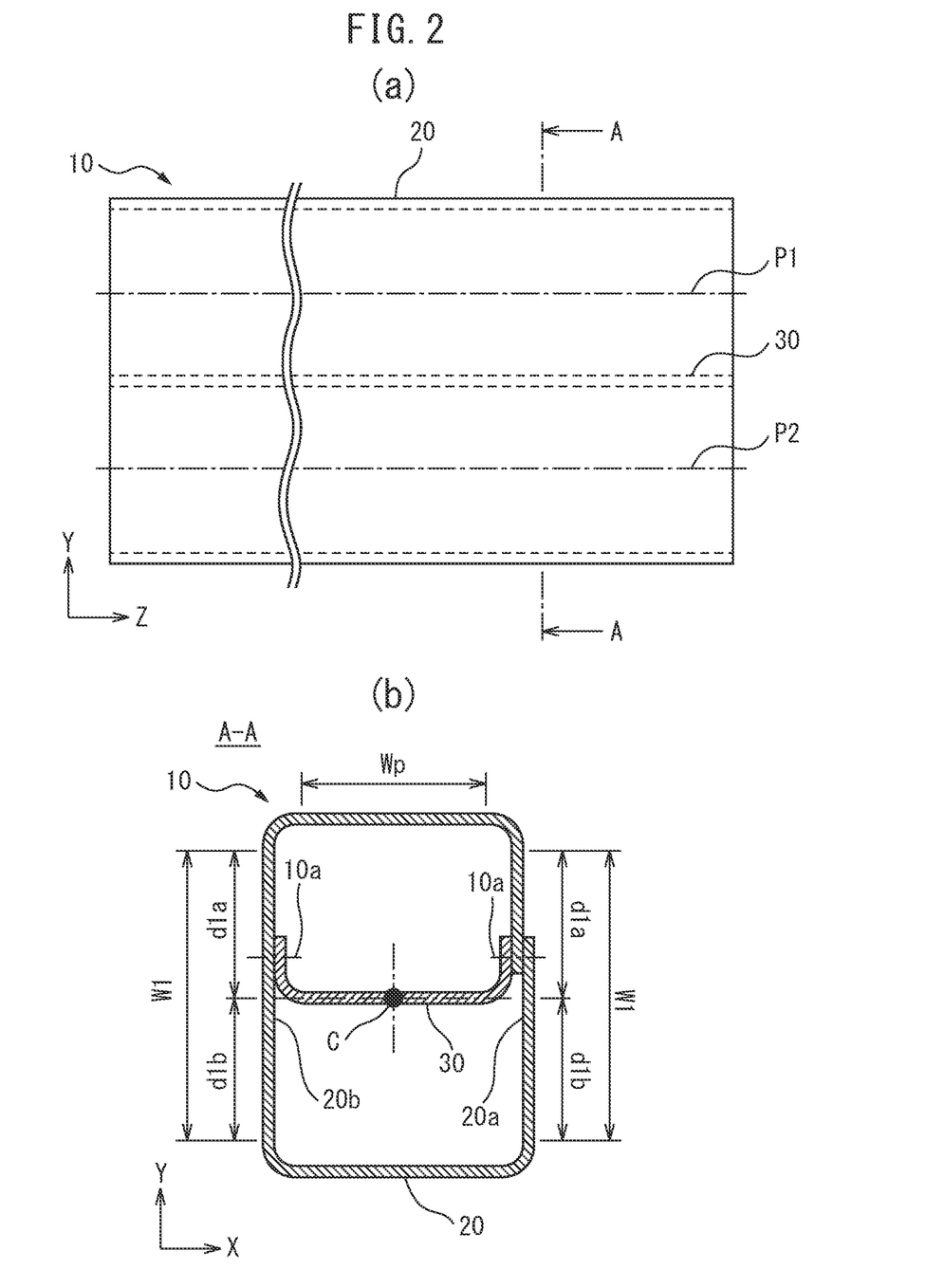
Figure 7:
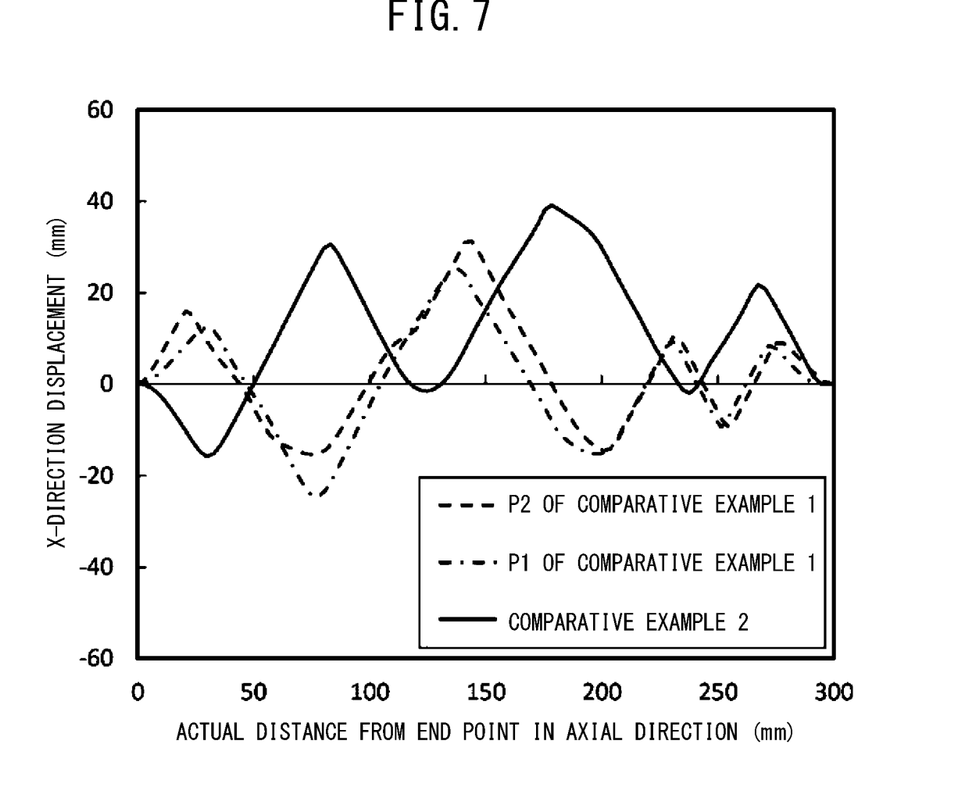
FIG. 7 is a view showing displacement in the X-direction at the long side surfaces of the impact absorbing members in the Comparative Example 1 and Comparative Example 2.

FIG. 7 is a view showing displacement in the X-direction at the long side surfaces of a conventional impact absorbing member and showing the test results of the later explained Comparative Example 1. In Comparative Example 1, the sheet thickness of the main body was made 0.8 mm and the sheet thickness of the center sheet was made 1.0 mm, so the sheet thickness of the main body and the sheet thickness of the center sheet were made the same extents. FIG. 7 shows the test results of Comparative Example 2 together. Comparative Example 2 is an example not provided with a center sheet. The X-direction displacement shown in FIG. 7 is displacement at the long side surfaces. At the long side surfaces, the two sides of the center sheet (P1 and P2 of FIG. 2(*a*)) are shown.

As shown in FIG. 7, in a conventional impact absorbing member (Comparative Example 1), the waveform due to the displacement (period of buckling) becomes the same phase at the two sides of the center sheet (P1, P2). Here, in a conventional impact absorbing member, the sheet thickness of the center sheet is thinner than or the same extent as the sheet thickness of the main body. For this reason, the rigidity of the center sheet becomes lower than the rigidity of the main body and as a result the waveform due to displacement becomes the same phase at the two sides of the center sheet.

Further, the center sheet deforms to track the long side surfaces of the main body. For this reason, in a conventional impact absorbing member, if not providing a center sheet (Comparative Example 2 of FIG. 7), the wavelength becomes the same extent. As a result, by providing the center sheet, the absorption energy increases, but the energy absorbed per unit mass does not generally change.

Note that, Comparative Example 1 has a sheet thickness of the main body of 0.8 mm and a sheet thickness of the center sheet of 1.0 mm. Strictly speaking, the sheet thickness of the center sheet is slightly thicker compared with the sheet thickness of the main body. In this way, the deformation behavior in the case where the sheet thickness of the center sheet is the same extent as the sheet thickness of the main body, while the test results are omitted, is similar to that of a conventional impact absorbing member, that is, the case where the sheet thickness of the center sheet is thinner than the sheet thickness of the main body and in the case where the sheet thickness of the center sheet is the same as the sheet thickness of the main body.

Figure 8:
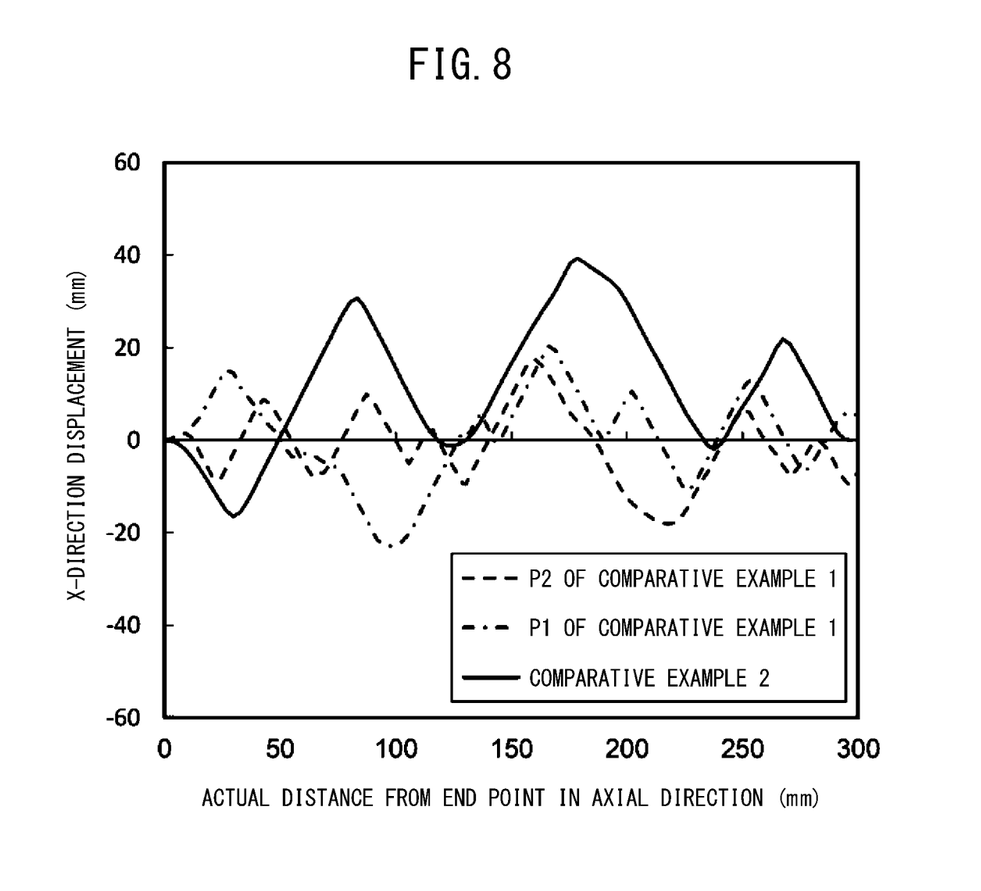
FIG. 8 is a view showing displacement in the X-direction at the long side surfaces of the impact absorbing members in the Invention Example 1 and Comparative Example 2.

FIG. 8 is a view showing the displacement in the X-direction in the impact absorbing member according to the present invention and is a view showing the test results of the later explained Invention Example 1. In the Invention Example 1, the sheet thickness of the main body was made 0.8 mm, the sheet thickness of the center sheet was made 2.0 mm, and the sheet thickness of the center sheet was made greater than the main body. FIG. 8 shows together the test results of Comparative Example 2. Comparative Example 2 is an example with no provision of a center sheet. The X-direction displacement shown in FIG. 8 is the displacement at the long side surfaces of the main body. At the long side surfaces, the two sides of the center sheet (P1 and P2 of FIG. 2(*a*)) are shown.

As shown in FIG. 8, in the impact absorbing member of the present embodiment, part of the waveform due to the displacement becomes opposite in phase at the two sides of the center sheet. This is because, in the impact absorbing member of the present embodiment, the sheet thickness of the center sheet is thicker than the sheet thickness of the main body, so the center sheet is higher in rigidity.

For this reason, the center sheet deforms so as to track the long side surfaces of the main body, but that deformation is greatly reduced. In this case, the long side surfaces of the main body can deform independently at the two sides of the center sheet. As a result, parts of the long side surfaces of the main body deform to become opposite phases at the two sides of the center sheet. Further, compared with when no center sheet is provided (Comparative Example 2 of FIG. 8), the amplitude of the waveform due to the displacement becomes smaller and the wavelength becomes shorter. Due to this, in the impact absorbing member of the present embodiment, not only does the absorption energy increase, but also the energy absorbed per unit mass can be increased.

In this way, the impact absorbing member of the present embodiment enables the energy absorbed per unit mass to be increased, so even if making the sheet thickness of the main body thinner, it is possible to secure the absorption of energy. For this reason, it becomes possible to secure absorption of energy while lightening the weight.

If the sheet thickness t1 of the main body 20 and the sheet thickness t2 of the center sheet 30 satisfy formula (1), that is, if the sheet thickness t2 is (1.3×t1) or more, rigidity of the center sheet to the main body can be secured. For this reason, deformation behavior such as explained while referring to FIG. 8 occurs. Not only does the absorption energy increase, but the energy absorbed per unit mass also can be increased. From the viewpoint of further improving the effect of making the energy absorbed per unit mass increase, the sheet thickness t2 is preferably made (1.4×t1) or more. (1.5×t1) or more is more preferable.

On the other hand, the effect resulting from making the sheet thickness of the center sheet greater tends to become saturated if the sheet thickness t2 exceeds (8×t1). For this reason, the sheet thickness t2 is preferably made (8×t1) or less, more preferably is made (5×t1) or less.

As explained using FIG. 3, the thinner the sheet thickness of the main body, the greater the effect of improvement of the energy absorbed per unit mass due to the increase of the sheet thickness of the center sheet. From the viewpoint of lightening the weight of the parts, the sheet thickness of the main body is preferably 2.3 mm or more, more preferably 2.0 mm or less, still more preferably 1.6 mm or less.

The main body has a polygonal shaped cross-section vertical to the axial direction. For example, it is possible to make it a tetragonal shape like in the above-mentioned example of the configuration. If made into a tetragonal shape, it may be made a rectangular shape or trapezoidal shape or a parallelogram shape. Further, the main body may be made a polygonal shape other than a tetragonal shape. For example, it may also be made a hexagonal shape.

The pair of long sides (20*a*, 20*b*) both preferably have widths W1 (mm) of the long sides satisfying the following formula (2) (see FIG. 2(*b*)). In the present embodiment, "widths W1 of the long sides" mean the lengths of the straight line parts other than the curved parts.

$$W1/t1 \leq 20 \tag{2}$$

The pair of long sides of the main body are both joined to the center sheet. If the widths W1 of these long sides both are both ratios (W1/t1) to the sheet thickness of the main body t11/t1) of 20 or more, when the long side surfaces of the main body deform, it is possible to secure the widths for independent deformation at the two sides of the center sheet. For this reason, the effect of increasing the energy absorbed per unit mass according to the present embodiment becomes stable. From the viewpoint of stabilizing this effect more, W1/t1 is more preferably made 25 or more.

On the other hand, if W1/t1 exceeds 200, the effect of increasing the energy absorbed per unit mass becomes saturated. For this reason, W1/t1 is preferably made 200 or less.

The main body and the center sheet can be joined by various methods so long as at the time of impact, the main body and the center sheet can deform together without separating. For example, overlay welding can be employed. In this case, for example, it is possible to employ continuous welding or spot welding at a predetermined pitch.

The main body may, for example, be fabricated from a single metal sheet. In this case, the metal sheet may be bent to as to form a polygonal shape in cross-section and, as shown in FIG. 2, welded at its two ends together with the center sheet by overlay welding.

When the main body 20 is comprised of a single metal sheet and is joined by overlay welding in this way, the pair of long sides (20a, 20b) both preferably have distances d1a (mm) and d1b (mm) along the extension direction of the long sides (20a, 20b) from the line running through the middle of thickness C of the center sheet 30 at the middle position of the center sheet 30 in the extension direction to the two end points of the long sides (20a, 20b) satisfying the following formula (3):

$$0.5 \leq d1a/d1b \leq 2 \tag{3}$$

d1a (mm) and d1b (mm) will be explained with reference to an example of the configuration where the straight line part of the center sheet is not vertical to the long sides of the main body and an example of configuration where the main body is a trapezoidal shape.

Figure 4:
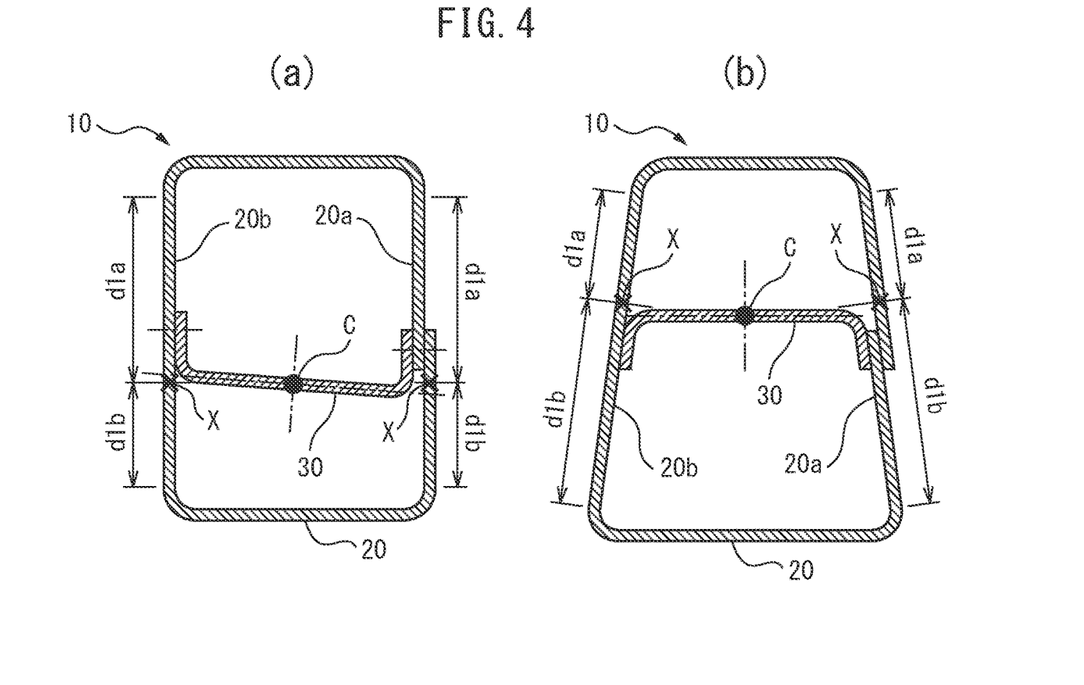

FIGS. 4A and 4B are cross-sectional views showing other examples of the configuration in the case where the main body is comprised of a single metal sheet, wherein FIG. 4(a) is an example of the configuration where the straight line part of the center sheet is not vertical to the long sides of the main body, while FIG. 4(b) is an example of the configuration where the main body is a trapezoidal shape. In the example of the configuration shown in FIG. 4(a), the cross-sectional shape of the main body 20 is a rectangular shape. On the other hand, the center sheet 30 has a straight line part not vertical to the long sides of the main body. In the example of the configuration shown in FIG. 4(b), the main body is a trapezoidal shape while the center sheet 30 has a straight line part not vertical to the long sides of the main body.

As shown in FIG. 2(b), FIG. 4(a), and FIG. 4(b), the distance d1a and the distance d1b are distances from the line running through the middle of thickness C of the center sheet 30 at the middle position of the center sheet 30 in the extension direction to the two end points at the long sides (20a, 20b). Such a distance d1a and distance d1b are both distances in the extension directions of the long sides (20a, 20b). In other words, the distance d1a and the distance d1b are straight line distances from the intersection of the vertical line dropped down from the middle of sheet thickness C of the center sheet 30 at the middle position of the center sheet 30 in the extension direction to the centerline of sheet thickness of the long sides (20a, 20b) and the middle line of sheet thickness of the long sides (20a, 20b) to the two end points of the long sides (20a, 20b).

In the present embodiment, the "middle position of the center sheet in the extension direction" means the middle position of the straight line part of the center sheet in the extension direction. Further, in the present embodiment, "end points of the long sides" mean end points of the straight line parts other than the curved parts.

By satisfying formula (3), the distances (d1a, d1b) relating to the long sides of the main body both become suitable and widths for independent deformation can be sufficiently secured at the two sides of the center sheet when the long side surfaces of the main body deform. For this reason, the effect of increasing the energy absorbed per unit mass according to the present embodiment is stable.

The main body can be prepared by joining two metal sheets by overlay welding. In this case, the thicknesses of the two metal sheets may also differ.

Figure 5:
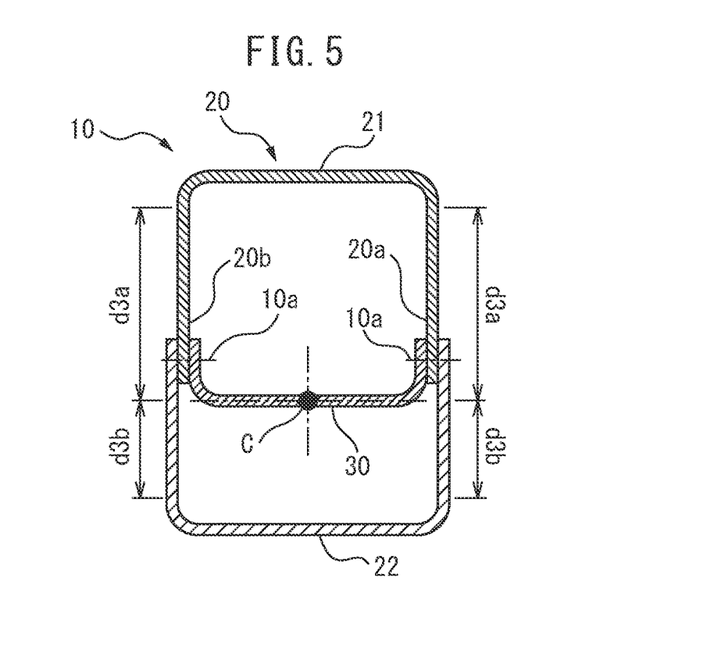
FIG. 5 is a cross-sectional view schematically showing an example of the configuration in the case where the main body is comprised of two metal sheets.

FIG. 5 is a cross-sectional view schematically showing an example of the configuration in the case where the main body is comprised of two metal sheets. The main body 20 shown in FIG. 5 is comprised of the first metal sheet 21 and the second metal sheet 22. The first metal sheet 21 forms part of a polygonal shape, while the second metal sheet 22 forms the balance of the polygonal shape. In other words, the main body 20 is divided in the middles of each of the long sides (20a, 20b), that is, at locations where the center sheet 30 is welded, into the two parts of the first metal sheet 21 and second metal sheet 22. For this reason, at the overlay welded portions, the first metal sheet 21 and second metal sheet 22 of the main body are welded in a state overlaid together with the center sheet 30.

In this way, when the main body is comprised of two metal sheets joined by overlay welding and the sheet thicknesses of the two metal sheets differ, to obtain the deformation behavior of the present embodiment, it is necessary that the sheet thicknesses of both of the two metal sheets satisfy formula (1). Further, the sheet thickness t2 of the center sheet is preferably (1.4×t1) or more with respect to both of the two metal sheets of the main body, more preferably (1.5×t1) or more. On the other hand, the sheet thickness t2 of the center sheet is preferably (8×t1) or less with respect to both of the two metal sheets of the main body, more preferably (5×t1) or less. Furthermore, the main body has sheet thicknesses of both of the two metal sheets of preferably 2.3 mm or less, more preferably 1.6 mm or less.

When the main body is comprised of two metal sheets joined by overlay welding, the pair of long sides (20a, 20b) both preferably have a distance d3a (mm) and a distance d3b (mm) satisfying the formula (4). Here, the distance d3a is the distance from the line running through the middle of thickness of the center sheet 30 at the middle position of the center sheet 30 in the extension direction to the end points of the long sides (20a, 20b) at the first metal sheet 21. Further, the distance d3b is the distance from the line running through the middle of thickness of the center sheet 30 at the middle position of the center sheet 30 in the extension direction to the end points of the long sides (20a, 20b) at the second metal sheet 22. These distance d3a and distance d3b are both distances in the extension directions of the long sides (20a, 20b) (see FIG. 5).

$$0.5 \leq (d3a/t1a)/(d3b/t1b) \leq 2 \tag{4}$$

By satisfying formula (4), the distances relating to the long sides of the main body (d3a, d3b) all become suitable. It is possible to sufficiently secure the widths for independent deformation at the two sides of the center sheet when the long side surfaces of the main body deform. For this reason, the effect of increasing the absorbed energy per unit mass according to the present embodiment is stable.

The metal sheet used for the main body is not particularly limited. If using metal sheet with a tensile strength of 780 MPa or more as a main body, this is advantageous from the viewpoint of strength when used as an impact absorbing member for an automobile. If using a steel sheet with a tensile strength of 980 MPa or more, it is further advantageous.

The metal sheet used for the center sheet is not particularly limited. If using metal sheet with a Young's modulus of 180 GPa or more as the center sheet, out-of-plane deformation of the main body is suppressed, so this is preferable.

The impact absorbing member of the present embodiment can be used as an impact absorbing member in an automobile, train, ship, or other transport machinery. More specifically, if used as an impact absorbing member of an automobile, it can be used for a crush box or frame member. In the case of a frame member, it can be used for a front side member, a rear side member, a side seal, or a floor cross member.

EXAMPLES

Impact tests were performed for confirming the effect of the impact absorbing member of the present embodiment.

In this test, analysis was conducted simulating a drop type impact test. Specifically, an impact absorbing member of the shape shown in FIGS. 2A and 2B was arranged with its axial direction in the vertical direction. In that state, a mass 700 kg weight was dropped from a height of 13.8 m and, due to this, was made to strike one end of the impact absorbing member. At this time, the load in the axial direction of the weight and the displacement in the axial direction were calculated and the relationship between the load and displacement was found. Further, displacement in the direction vertical to the plane including the weld zone (X-direction) was found for one of the long side surfaces of the impact absorbing member after the impact test. The displacement in the X-direction was found at the two sides of the center sheet, specifically, at the positions P1 and P2 of FIG. 2(a).

The impact absorbing member 10 was made one with a length in the axial direction of 300 mm. The main body 20 has a rectangular cross-sectional shape. The pair of long sides (20a, 20b) both have a W1 of 128 mm, a d1a of 56.6 mm, a d1b of 83.4 mm, and a distance between facing long sides of 70 mm Further, the curved parts connecting the long sides and short sides of the rectangular shape were all made arcs of radii of 6 mm. The center sheet 30 was provided so that the part arranged parallel to the short sides of the main body 20 was positioned at the center of the facing short sides. For the main body 20 and center sheet 30, steel sheets with a tensile strength of the 980 MPa class were used.

For the weld zones between the main body 20 and the center sheet 30, boundary conditions simulating spot welding are set. More specifically, boundary conditions were set simulating the case of forming 5 mm diameter spot welds at a 45 mm pitch.

In the invention examples, the sheet thickness of the main body 20 was made 0.8 mm and the sheet thickness of the center sheet 30 was made 2 mm. In Comparative Example 1, the sheet thickness of the main body 20 was made 0.8 mm and the sheet thickness of the center sheet 30 was made 1 mm. In Comparative Example 2, no center sheet 30 was provided and the sheet thickness of the main body 20 was made 0.8 mm.

Figure 6:
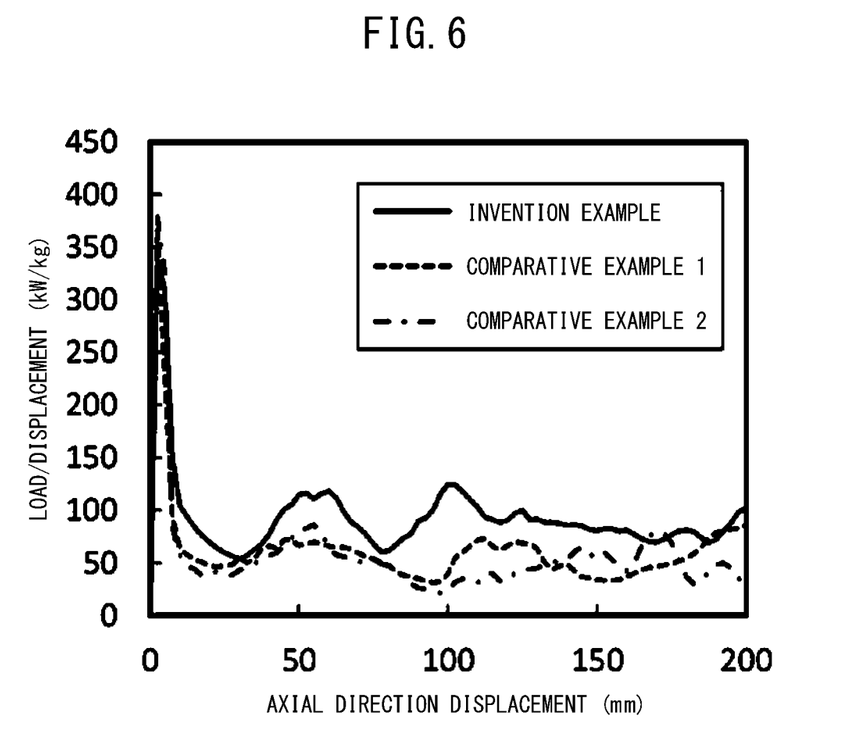
FIG. 6 is a view showing the relationship between a load and displacement (axial direction displacement) of the examples.

FIG. 6 is a view showing the relationship between the load and displacement (axial direction displacement) of the examples. In FIG. 6, the load (kN) is shown by the load per unit mass (kN/kg). As shown in FIG. 6, the loads in the invention examples and comparative examples are about the same when the displacement is less than about 10 m at the initial stage of deformation, but when the displacement is 10 mm or more, the load of the invention examples is mostly higher than Comparative Examples 1 and 2. That is, it became clear that the impact absorbing member of the present embodiment is better in energy absorbing efficiency.

FIG. 7 is a view showing displacement in the X-direction at the long side surfaces of the impact absorbing members in Comparative Example 1 and Comparative Example 2. From FIG. 7, in Comparative Example 1, the waveform due to the displacement is the same in phase at the two sides of the center sheet. Further, in Comparative Example 1, the waveform was the same extent as Comparative Example 2 not provided with the center sheet.

FIG. 8 is a view showing displacement in the X-direction at the long side surfaces of the impact absorbing members in Invention Example 1 and Comparative Example 2. From FIG. 8, in the invention examples, part of the waveform due to the displacement becomes opposite in phase at the two sides of the center sheet. Further, compared with the case where no center sheet is provided (Comparative Example 2 of FIG. 8), the amplitude becomes smaller and the wavelength becomes shorter.

In this way, in the impact absorbing member of the present embodiment, buckling deformation differing in phase occurs at the two sides of the center sheet, the amplitude of the deformation becomes smaller, and the wavelength becomes shorter. Due to this, it could be confirmed that the impact absorbing member of the present embodiment is excellent in energy absorbing efficiency.

INDUSTRIAL APPLICABILITY

The impact absorbing member of the present invention can secure absorption energy while being able to be lightened in weight. For this reason, if applied to a crush box or frame member of an automobile, it is possible to greatly contribute to improvement of the fuel efficiency.

REFERENCE SIGNS LIST 1a, 1b. crush box
2. front side member
3. rear side member
4, 4'. floor cross member
5. bumper reinforcement
6. center pillar
7. side seal
10. impact absorbing member
10a. welding position
20. main body
20a. first long side
20b. second long side
21. first metal sheet
22. second metal sheet
30. center sheet

The invention claimed is:

1. An impact absorbing member absorbing an impact load applied in an axial direction comprising:
a main body comprised of metal sheet and having a polygonal shape in a cross-section vertical to the axial direction; and
a center sheet comprised of metal sheet and provided in a hollow part inside the main body along the axial direction,
wherein the polygonal shape of the main body includes a pair of long sides facing each other,
the center sheet is joined to each of the long sides of the polygonal shape of the main body, and
a sheet thickness of the center sheet is greater than a sheet thickness of the main body, wherein in the pair of the long sides, a width W1 (mm) of the long side satisfies the following formula (2):

$$W1/t1 \geq 20 \qquad (2).$$

2. An impact absorbing member absorbing an impact load applied in an axial direction comprising:
   a main body comprised of metal sheet and having a polygonal shape in a cross-section vertical to the axial direction; and
   a center sheet comprised of metal sheet and provided in a hollow part inside the main body along the axial direction,
   wherein the polygonal shape of the main body includes a pair of long sides facing each other,
   the center sheet is joined to each of the long sides of the polygonal shape of the main body, and
   a sheet thickness of the center sheet is greater than a sheet thickness of the main body, wherein
   the main body is comprised of a single metal sheet,
   the center sheet is joined to each of the long sides of the polygonal shape of the main body by an overlay welding, and
   in the pair of the long sides, distances d1$a$ (mm) and d1$b$ (mm) along a width direction of the long sides satisfy the following formula (3), the distances d1$a$ (mm) and d1$b$ (mm) being from the middle of the sheet thickness of the center sheet at the middle position in a width direction of the center sheet to both end points of the long sides:

$$0.5 \leq d1a/d1b \leq 2 \qquad (3).$$

3. An impact absorbing member absorbing an impact load applied in an axial direction comprising:
   a main body comprised of metal sheet and having a polygonal shape in a cross-section vertical to the axial direction; and
   a center sheet comprised of metal sheet and provided in a hollow part inside the main body along the axial direction,
   wherein the polygonal shape of the main body includes a pair of long sides facing each other,
   the center sheet is joined to each of the long sides of the polygonal shape of the main body, and
   a sheet thickness of the center sheet is greater than a sheet thickness of the main body,
   wherein
   the main body is comprised of a first metal sheet forming a part of the polygonal shape and a second metal sheet forming a remainder of the polygonal shape,
   the first metal sheet and the second metal sheet are joined at each of the long sides of the polygonal shape by an overlay welding together with the center sheet, and in the pair of the long sides, a distance d3$a$ (mm) along a width direction of the long sides, the distance from the middle of the sheet thickness of the center sheet at the middle position in a width direction of the center sheet to an end point of the long sides in the first metal sheet, and a distance d3$b$ (mm) along a width direction of the long sides, the distance from the middle of the sheet thickness of the center sheet at the middle position in a width direction of the center sheet to an end point of the long sides in the second metal sheet, satisfies the following formula (4):

$$0.5 \leq (d3a/t1a)/(d3b/t1b) \leq 2 \qquad (4)$$

where, t1$a$ (mm) is a sheet thickness of the first metal sheet, and t1$b$ (mm) is a sheet thickness of the second metal sheet.

4. An impact absorbing member absorbing an impact load applied in an axial direction comprising:
   a main body comprised of metal sheet and having a polygonal shape in a cross-section vertical to the axial direction; and
   a center sheet comprised of metal sheet and provided in a hollow part inside the main body along the axial direction,
   wherein the polygonal shape of the main body includes a pair of long sides facing each other,
   the center sheet is joined to each of the long sides of the polygonal shape of the main body, and
   a sheet thickness of the center sheet is greater than a sheet thickness of the main body,
   wherein the metal sheet forming the center sheet has a Young's modulus of 180 GPa or more.

5. The impact absorbing member according to any one of claims 1, 2, 3, and 4, wherein the sheet thickness of the main body is 2.3 mm or less.

6. The impact absorbing member according to any one of claims 1, 2, 3, and 4, wherein the sheet thickness t1 (mm) of the main body and the sheet thickness t2 (mm) of the center sheet satisfy the following formula (1):

$$1.3 \times t1 \leq t2 \qquad (1).$$

7. The impact absorbing member according to any one of claims 1, 2, 3, and 4,
   wherein the metal sheet forming the main body is a steel sheet having a tensile strength of 780 MPa or more.

8. The impact absorbing member according to any one of claims 1, 2, 3, and 4, used for a crush box, a front side member, a rear side member, a side seal, or a floor cross member of an automobile.

* * * * *